Oct. 8, 1968 D. J. MacGREGOR ETAL 3,404,613
PHOTOGRAPHIC FILM CONTAINER
Filed Oct. 22, 1965
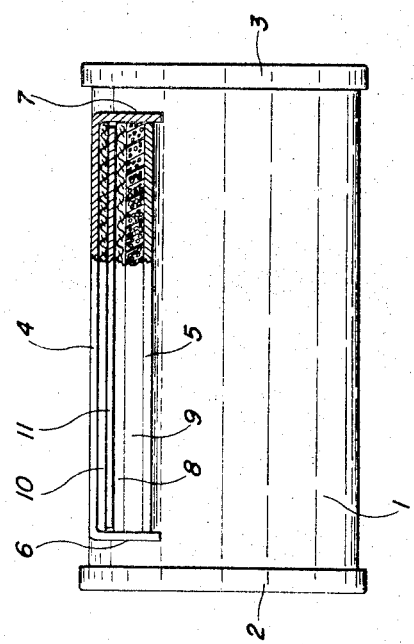
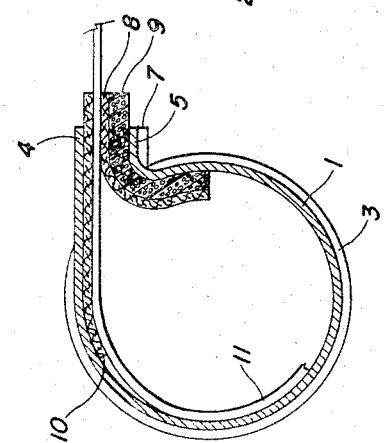
DEAN J. MACGREGOR
JOHN W. WEBER
INVENTORS
BY R. Frank Smith
Thomas R. Lampe
ATTORNEYS 3,404,613
PHOTOGRAPHIC FILM CONTAINER
Dean J. MacGregor and John W. Weber, Rochester, N.Y.,
assignors to Eastman Kodak Company, Rochester,
N.Y., a corporation of New Jersey
Filed Oct. 22, 1965, Ser. No. 501,304
5 Claims. (Cl. 95—31)

ABSTRACT OF THE DISCLOSURE

An improved film cassette employing a substantially pileless material-foam laminate as a film support and light sealing member in the exit slot of the cassette.

---

This invention relates to cassettes for photographic film, and more particularly, to cassettes having means thereon for providing a light-tight seal and support for the photographic film therein.

In the past, numerous arrangements have been proposed in photographic film cassettes of this type to prevent the passage of exterior light into the interior of the cassette while at the same time permitting movement of the photographic film past the seal means when said film is being loaded into the cassette or unloaded therefrom. The usual cassette or container for 35 mm. film comprises a substantially cylindrical casing having a rotatable spool disposed therein and an exit slot in the casing for the ingress and egress of the photographic film. To provide support for the film as it passes through said slot a pair of lips associated therewith is customarily provided having a light seal material such as velvet cloth attached thereto. The light seal material protects the film from damage which might result if it rubbed on the container, and it prevents the entrance of light into the container. However, the numerous threads or pile characteristic of velvets tend to make the force required to pull the film from the container variable, and in some cases, excessively high. It is believed this variability results from the random orientation of the pile which may be opposed to film travel in some cases while aiding it in others. Also, there is a tendency for the pile from the velvet on the upper and lower lips to interlock through the film perforations, requiring excessively high pull force to move the film. These high pull forces, even if of short duration, cause the film to bear against camera surfaces with resulting scratching and customer complaints. A further undesirable result of materials of this type is that the short velvet fibers constituting the pile often break loose causing objectionable dirt on the surface of the photographic film.

It is therefore an object of the present invention to provide a container construction for photographic film incorporating a light seal and film support means which effectively eliminates the troublesome numerous threads of the velvet cloth material presently being used on containers of this type.

Another object of this invention is to provide a light seal and film supporting means which allows the passage of film therethrough by means of a reasonably constant pull force.

The above objectives have been attained in the present invention by utilizing a substantially pileless material-foam laminate in place of the velvet cloth or similar materials presently being used, and positioning said laminate with respect to the exit slot lips to provide maximum effectiveness thereof as a light-tight seal and film support.

Other objects, purposes, and characteristic features of the present invention will be obvious from the accompanying drawings, and from the following description of the invention.

In describing the invention in detail, reference will be made to the accompanying drawings in which like reference characters designate corresponding parts throughout the several views, and in which:

FIG. 1 is a sectional view taken through the film cassette incorporating a preferred embodiment of the present invention and showing in detail a preferred light seal and film support means;

FIG. 2 is a frontal, partial sectional view of the cassette showing the positioning of the light seal and film support means with respect to the cassette exit slot lips.

Referring now to FIGS. 1 and 2, a film cassette is shown having a substantially cylindrical outer casing 1 having a pair of end caps 2, 3 associated therewith in the usual manner. End caps 2, 3 may be staked to the cylindrical casing 1 in a manner well known in the art to prevent ready removal thereof or, alternatively, may be snap fastened to the cylindrical casing in any desired manner to permit removal thereof. The walls of casing 1 are deformed in the manner shown to provide lips 4, 5 defining an elongated exit slot. As may most readily be seen with reference to FIG. 2, the longitudinal extent of the exit slot is defined by downturned portions 6, 7 of the upper lip 4. The downturned portions 6, 7 help prevent the passage of light through the edges of the exit slot and, in addition, increase the rigidity of upper lip 4 thereby decreasing the dimensional variation of the exit slot.

Attached to the inner surface of lower lip 5 and extending in the manner shown into the interior of said casing is a foam-cloth laminate comprising, in a preferred embodiment, an outer layer 8 of substantially pileless woven textile material (i.e., a textile material which is substantially free from short single fibers, as distinguished from looped fibers, which extend outwardly from the surface of said material) laminated to an under layer 9 of plastic foam. A laminate which has been found to have highly desirable characteristics is one formed of a woven nylon thread material flame-laminated to a layer of polyurethane foam. Attached to the inner surface of upper lip 4 and extending into the interior of the container in the manner shown is a single layer of the substantially pileless woven textile material 10, preferably also a woven nylon thread material. The foam-cloth laminate 8, 9 and the layer of woven textile material 10 may be attached to the surface of the casing 1 and to the lips 4, 5 thereof in any suitable manner, such as by a glue or other adhesive substance.

A strip of photographic film 11 is disposed within casing 1 in the usual fashion. In conventional cassettes of this type the film is wound upon a rotatable spool mounted within the casing. For the purpose of more clearly disclosing the claimed subject matter of this invention, the rotatable spool structure has not been shown and the photographic film has been illustrated only insofar as it will lend clarity to the operation of the device. In addition, the size of the seal structure has been slightly exaggerated to illustrate more clearly the composition and arrangement thereof. Due to the inherent elasticity of photographic film, which normally comprises an emulsion coated on a cellulose acetate or polyester base, it "clock springs" against the inner cylindrical surface of the casing in the manner shown. The inwardly extending portion of fabric layer 10 provides a mating surface for the film as it is withdrawn from the container. As may clearly be seen, the only surfaces contacting the film 11 as it exists from the cassette slot are the inner surfaces of the layers of the substantially pileless woven textile material. This material provides a smooth contacting surface for the film thereby allowing movement thereof under a substantially constant pull force, and, in addition, eliminates the problems inherent in materials presently in use with respect to breakage of short threads and consequent dirtying of the film as it passes through the associated exit slot.

The polyurethane foam used in the disclosed embodiment requires very little force to compress, so the force normal to the film is reasonably constant with dimensional variations of the exit slot. It may thus be seen that smooth contacting surfaces are provided for the photographic film, and that the film is yieldably retained against such surfaces with a reasonably constant force by the plastic foam layer. In the present embodiment, the film is illustrated as being substantially the same width as its associated exit slot. It could, however, be of less width than said slot, in which case the laminate, due to the inherent resiliency of the plastic foam layer, would yieldably position itself about the edges of the film, thereby aiding as a light seal means in conjunction with the downturned portions 6, 7.

Although only one specific embodiment of the present invention is disclosed herein, it should be understood that the particular form disclosed has been selected to facilitate explanation of the invention rather than to limit the number of forms which it may assume. For example, it is considered feasible to use the disclosed foam-cloth laminate on both the upper and lower lips of the exit slot, or to use other types of foam or fabric having properties similar to the preferred embodiment. Further, it should be understood that various modifications, alterations, and adaptations may be applied to the specific form described to meet the requirements of practice without in any manner departing from the spirit or scope of the present invention.

What is claimed is:

1. In a film cassette of the type having a light-tight casing having an interior for the storage of photographic film and a pair of lips on said casing defining an elongated film passage communicating with said interior, the improvement comprising: light seal and film support means including a substantially pileless material-foam laminate affixed to at least one of said lips and extending at least partially into said film passage, said laminate being arranged on said lip such that said foam portion is in contact with the lip and the material portion is in contact with the film.

2. The improvement according to claim 1 wherein said laminate comprises a layer of plastic foam laminated to a layer of substantially pileless woven material.

3. The improvement according to claim 1 wherein said substantially pileless material-foam laminate extends at one end thereof into the interior of the cassette and at the other end thereof projects slightly beyond the lip with which it is associated.

4. The improvement according to claim 1, wherein said light seal and film support means is affixed to one of said lips and a lining of substantially pileless woven material is affixed to the other of said lips.

5. The improvement according to claim 1, wherein said laminate comprises a layer of polyurethane foam flame-laminated to a layer of woven nylon thread material.

References Cited

UNITED STATES PATENTS

| 1,794,426 | 3/1931 | Taylor | 242—71.1 |
| 1,964,879 | 7/1934 | Jelinek | 242—71.1 |
| 2,476,996 | 7/1949 | Nebel | 242—71.1 |
| 2,484,225 | 10/1949 | Herzig | 242—71.1 |
| 2,571,796 | 10/1951 | Ulmschnemer | 242—71.1 |

NORTON ANSHER, *Primary Examiner.*

R. A. SCHROEDER, *Assistant Examiner.*

Disclaimer 3,404,613.—*Dean J. MacGregor* and *John W. Weber*, Rochester, N.Y. PHOTOGRAPHIC FILM CONTAINER. Patent dated Oct. 8, 1968. Disclaimer filed Dec. 11, 1968, by the assignee, *Eastman Kodak Company*.
Hereby enters this disclaimer to claims 1 through 5 of said patent.
[*Official Gazette April 29, 1969.*]